United States Patent
de Vangel et al.

(10) Patent No.: US 12,254,400 B2
(45) Date of Patent: Mar. 18, 2025

(54) OPTIMIZING ARTIFICIAL NEURAL NETWORK COMPUTATIONS BASED ON AUTOMATIC DETERMINATION OF A BATCH SIZE

(71) Applicant: Mipsology SAS, Palaiseau (FR)

(72) Inventors: Benoit Chappet de Vangel, Paris (FR); Thomas Cagnac, Longpont sur Orge (FR); Benjamin Poumarede, Paris (FR); Ludovic Larzul, El Dorado Hills, CA (US)

(73) Assignee: Mipsology SAS, Palaiseau (FR)

( * ) Notice: Subject to any disclaimer, the term of this patent is extended or adjusted under 35 U.S.C. 154(b) by 511 days.

(21) Appl. No.: 16/244,267

(22) Filed: Jan. 10, 2019

(65) Prior Publication Data
US 2020/0226458 A1    Jul. 16, 2020

(51) Int. Cl.
*G06N 3/08* (2023.01)

(52) U.S. Cl.
CPC ...................... *G06N 3/08* (2013.01)

(58) Field of Classification Search
None
See application file for complete search history.

(56) References Cited

U.S. PATENT DOCUMENTS 7,711,797 B1 *   5/2010   Huang .............. H04L 67/2847
                                                  709/218
10,846,096 B1 * 11/2020   Chung ................. G06F 9/3855

| | | | |
|---|---|---|---|
| 2009/0138770 A1* | 5/2009 | Nakaya | G01R 31/318516 |
| | | | 714/725 |
| 2017/0228645 A1* | 8/2017 | Wang | G06N 3/0454 |
| 2017/0286861 A1* | 10/2017 | Kelly | G06N 20/00 |
| 2017/0344882 A1* | 11/2017 | Ambrose | G06F 3/0673 |
| 2018/0307894 A1* | 10/2018 | Lim | G06V 40/16 |

(Continued)

FOREIGN PATENT DOCUMENTS

EP    3346425 A1    7/2018

OTHER PUBLICATIONS

A. Devarakonda et al. AdaBatch: Adaptive Batch Sizes for Training Deep Neural Networks. Feb. 14, 2018. [retrieved from arXiv on Jan. 29, 2022] <URL: https://arxiv.org/pdf/1712.02029.pdf> (Year: 2018).*

(Continued)

*Primary Examiner* — Bion A Shelden
(74) *Attorney, Agent, or Firm* — Georgiy L. Khayet (57) ABSTRACT

Systems and methods for optimizing artificial neural network (ANN) computations based on automatic determination of a batch size are disclosed. An example method may comprise receiving, by an optimization module, an ANN structure associated with the ANN, and generating, based on the ANN structure, a configuration for a computation engine capable of performing computation of the layers of the ANN. The configuration may include information concerning a batch size of one or more layers of the ANN. The batch size of a layer can be determined based on a bandwidth required to read data related to layer, a number of parameters associated with the layer, and a time the layer processes one input dataset from the batch. The batch size of the layer can differ from the batch size of the ANN. The batch size of the layer may differ from a batch size of another layer of ANN.

20 Claims, 9 Drawing Sheets

(56) References Cited

U.S. PATENT DOCUMENTS

| | | | |
|---|---|---|---|
| 2018/0373976 A1* | 12/2018 | Woo | G06F 9/4881 |
| 2019/0087721 A1* | 3/2019 | Prakash | G06N 3/0445 |
| 2019/0228298 A1* | 7/2019 | Suzuki | G06N 5/02 |
| 2020/0042362 A1* | 2/2020 | Cui | G06F 9/5027 |
| 2020/0042856 A1* | 2/2020 | Datta | G06N 3/063 |
| 2020/0125926 A1* | 4/2020 | Choudhury | G06N 3/0454 |
| 2020/0175374 A1* | 6/2020 | Hestness | G06N 3/0472 |

OTHER PUBLICATIONS

NIST. Engineering Statistics Handbook: 5.5.3. How do you optimize a process? [archived on Feb. 19, 2001] [retrieved on Jun. 27, 2022] <URL: https://web.archive.org/web/20010219000909/https://www.itl.nist.gov/div898/handbook/pri/section5/pri53.htm> (Year: 2001).*

DT. Vooturi et al. Efficient Inferencing of Compressed Deep Neural Networks. arXiv. Nov. 1, 2017. [retrieved on Jun. 27, 2022] <URL: https://arxiv.org/pdf/1711.00244.pdf> (Year: 2017).*

* cited by examiner

OPTIMIZING ARTIFICIAL NEURAL NETWORK COMPUTATIONS BASED ON AUTOMATIC DETERMINATION OF A BATCH SIZE

TECHNICAL FIELD

The present disclosure relates generally to data processing and, more particularly, to systems and methods for optimizing artificial neural network (ANN) computations based on automatic determination of a batch size.

BACKGROUND

Artificial Neural Networks (ANNs) are simplified and reduced models reproducing behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each connection can be associated with an operation of a multiplication by a constant. The ANNs are particularly useful for solving problems that cannot be easily solved by classical computer programs.

While types of the ANNs may vary, they all have the same basic elements similar to the human brain. A typical ANN can be organized into layers, each of the layers may include many neurons sharing similar functionality. Inputs of a layer may come from a previous layer, multiple previous layers, any other layers or even the layer itself. Major architectures of ANNs include Convolutional Neural Network (CNN), Recurrent Neural Network (RNN), and Long Term Short Memory (LTSM) network, but other architectures of ANN can be developed for specific applications. While some operations have a natural sequence, for example a layer depending on previous layers, most of the operations can be carried out in parallel within the same layer. The ANNs can then be computed in parallel on many different computing elements similar to neurons of the brain. A single ANN may have hundreds of layers. Each layer may include millions of connections. Thus, a single ANN may potentially require billions of simple operations like multiplications and additions.

Because of the large number of operations and their parallel nature, ANNs can result in a very heavy load for processing units (e.g., CPU), even the ones running at high speeds. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes, which results in latency and lack of reactivity. To deliver the maximum throughput, very large GPUs can be used which involve excessive power consumption, a typical issue of GPUs. Since the GPUs may require more power consumption for the computations of ANNs, the deployment of GPUs can be difficult.

To summarize, CPUs provide a very generic engine that can execute very few sequences of instructions with a minimum effort in terms of programming, but lack the power of computing required for ANNs. GPUs are slightly more parallel and require a larger effort of programming than CPUs, which can be hidden behind libraries with some performance costs, but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. Programming FPGAs, however, is challenging, requiring a much larger effort than programming CPUs and GPUs. Thus, adaption of FPGAs to perform ANN computations can be more challenging than for CPUs and GPUs.

Most attempts in programming FPGAs to compute ANNs have been focusing on a specific ANN or a subset of ANNs, or required modifications to the ANN structure to fit into a specific limited accelerator, or provided a basic functionality without solving the problem of computing ANN on FPGAs globally. The computation scale is typically not taken into account by existing FPGA solutions, many of the research being limited to a single or few computation engines, which could be replicated. Furthermore, the existing FPGA solutions do not solve the problem of massive data movement required at a large scale for the actual ANN involved in real industrial applications.

The inputs computed with an ANN are typically provided by an artificial intelligence (AI) framework. Those programs are used by the AI community to develop new ANN or global solutions based on ANN. However, FPGAs typically lack integration with AI frameworks. Furthermore, in order to optimize the computations, input data can be bundled together and processed together as well. This is known as batching input data. The batching is the ability by a user to manually define the number of pieces of data that will be bundled together in a framework. Typically, there are no tools to automate this process.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer-implemented systems and methods for optimizing ANN computations based on automatic determination of a batch size. Some embodiments of the present disclosure can facilitate reduction in time required for computer systems to perform ANN computations for a batch by determining batch sizes individually for each layer of the ANN and a sequence of a computation of layers for inputs sets from the batch.

According to one example embodiments, a system for optimizing ANN computations based on automatic determination of a batch size for an ANN is provided. The system may include a computation engine capable of performing computations of one or more layers of the ANN and an optimization module. The optimization module can be capable of receiving an ANN structure associated with the ANN and generating, based on the ANN structure, a configuration for the computation engine. The configuration may include information concerning batch sizes of one or more layers of the ANN.

The optimization module may determine a batch size of a layer based on one or more of the following: a bandwidth required to read data related to the layer, a number of parameters associated with the layer, and a time the layer processes one input dataset from the batch. The batch size of a layer can differ from the batch size of the ANN. The ANN may include at least a first layer and a second layer, such that the batch size of the first layer differs from the batch size of the second layer. The optimization module can be capable of determining the batch size for the ANN based on the batch sizes of the layers of the ANN.

The computation engine may include one or more processing units capable of performing operations associated with layers of the ANN. The computation engine may further include a controller capable of configuring the processing units to repeat operations of a subpart of the ANN for different input datasets from a batch of input datasets. The subpart may include connected layers of the ANN. The controller may configure the processing units to perform, simultaneously, computations of a first layer of the ANN for a first input dataset of a batch of input datasets and computations of the first layer for a second input dataset of the batch of input datasets prior to computation of a second layer of the ANN, wherein an input dataset of the second layer includes an output dataset of the first layer.

The computation engine can be implemented on a FPGA and the optimization module can be implemented as a software-based module. The optimization module can be capable of performing one or more iterations of selecting batch sizes of the layers of the ANN to optimize a performance measure. The performance measure can be a function of one or more of: a desired batch size of ANN, a latency of the ANN, and a throughput of the ANN. The optimization module can be capable of performing the iterations until a number of the iterations exceeds a predetermined threshold or the performance measure exceeds a pre-determined threshold. The performance measure can be set based on a user input. The optimization module can be capable of selecting the batch sizes of some of the layers of the ANN based on a heuristic algorithm.

According to another example embodiment, a method for optimizing ANN computations based on automatically determining a batch size for an ANN is provided. The method may include receiving, by an optimization module, an ANN structure associated with the ANN. The method may further include generating, based on the ANN structure, a configuration for a computation engine capable of performing computations of the layers of the ANN. The configuration can include information concerning a batch size of one or more layers of the ANN. The method may further include determining, by the optimization module and based on the batch size of the one or more layers of the ANN, the batch size for the ANN.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are directed to methods and systems for optimizing ANN computations based on automatic determination of a batch size. Embodiments of the present disclosure may facilitate acceleration of ANN computation for a batch of input datasets by assigning a batch size to each of the layers in ANN. The batch size of the layer can be based on a latency of the layer, number of parameters associated with the layer, and bandwidth of the layer. Some embodiments of the present disclosure may allow determining batch sizes of an ANN to optimize performance which can be based on a latency of the ANN or throughput of the ANN.

While some embodiments of the present disclosure are described herein in reference to operations of FPGAs, the present technology may be also practiced with application-specific integrated circuits (ASICs), programmable logic devices, transistor-based circuits, or various combinations thereof. The methods described herein can be implemented by hardware modules, software modules, or combinations of both. In some embodiments, the methods can be embodied in computer-readable instructions stored on computer-readable media.

The term "module" shall be construed to include a hardware device, software, or a combination of both. For example, a hardware-based module can use one or more microprocessors, FPGAs, application-specific integrated circuits (ASICs), programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, a module may refer to a subpart of a computer system, a hardware device, an integrated circuit, or a computer program.

Technical effects of certain embodiments of the present disclosure can result in reducing the time required for integrated circuits, FPGAs, or computer systems to perform ANN computations for a batch. Further technical effects of certain embodiments of the present disclosure can allow determining an optimal batch size for the ANN computations based on the structures of ANN and the architecture of the computer system configured to perform computations of the ANN.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
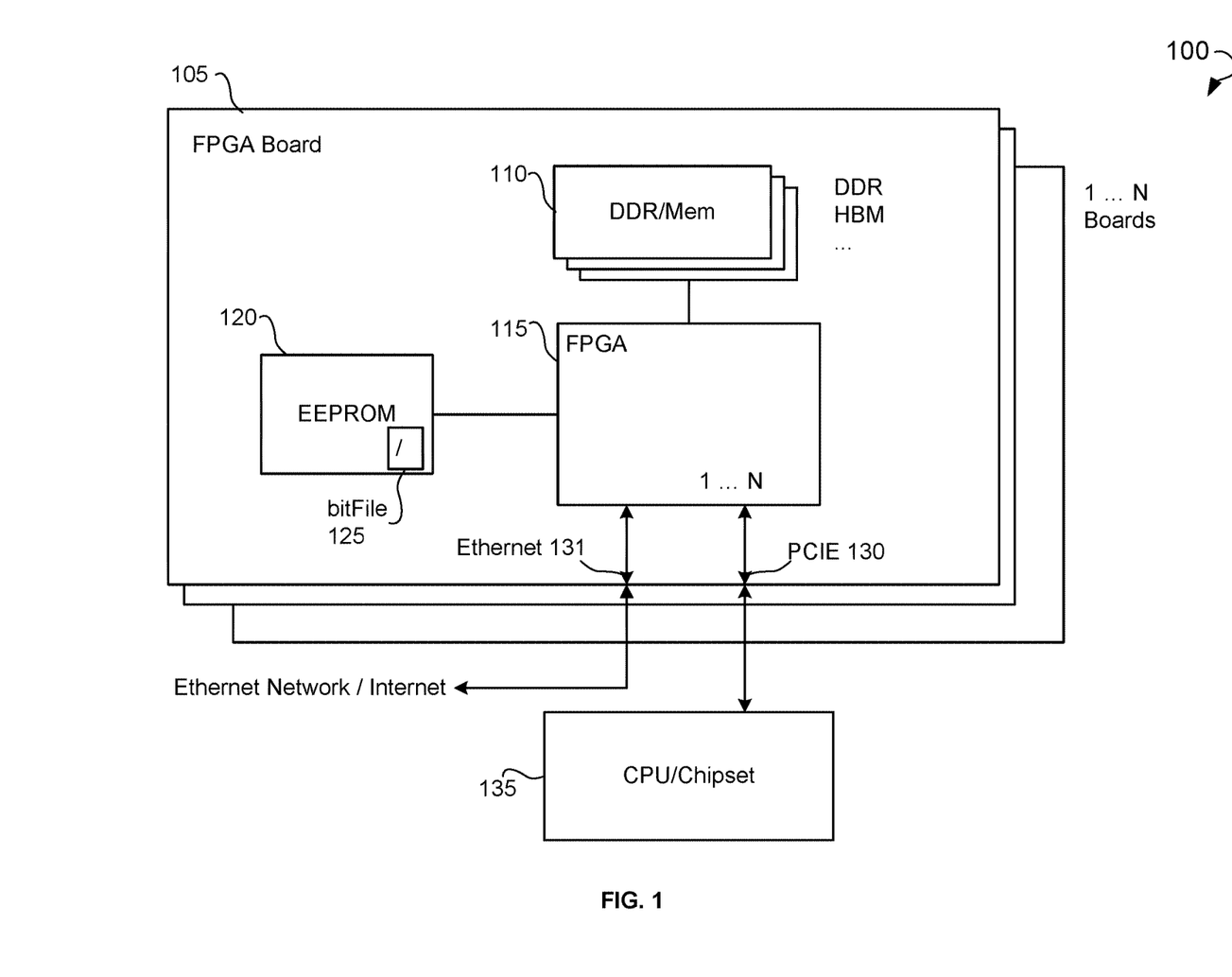
FIG. 1 is a block diagram showing an example system for optimizing ANN computations based on automatic determination of a batch size, according to some example embodiments.

FIG. 1 is a block diagram showing an example system 100 for optimizing ANN computations based on automatic determination of a batch size, according to some example embodiments. The system 100 can be part of a computing system, such as a personal computer, a server, a cloud-based computing recourse, and the like. The system 100 may include one or more FPGA boards 105 and a chipset 135 including at least one CPU. The chipset 135 can be communicatively connected to the FPGA boards 105 via a communication interface. The communication interface may include a Peripheral Component Interconnect Express (PCIE) standard 130. The communication interface may also include an Ethernet connection 131.

The FPGA board 105 may include an FPGA 115, a volatile memory 110, and a non-volatile memory 120. The volatile memory 110 may include a double data rate synchronous dynamic random-access memory (DDR SDRAM), High Bandwidth Memory (HBM), High Bandwidth Cache (HBC), graphics DDR SDRAM, or any other type of memory. The volatile memory 110 may include the host memory. The non-volatile memory 120 may include Electrically Erasable Programmable Read-Only Memory (EEPROM), a solid-state drive (SSD), a flash memory, and so forth.

The FPGA 115 can include blocks. The blocks may include a set of elementary nodes (also referred to as gates) performing basic hardware operations, such as Boolean operations. The blocks may further include registers retaining bit information, one or more memory storage of different sizes, and one or more digital signal processors (DSPs) to perform arithmetic computations, for example, additions and multiplications. Programming FPGA 115 may include configuring each of the blocks to exhibit an expected behavior and connecting the blocks by routing information between the blocks. Programming FPGA 115 can be carried out using a result from a compiler taken as an input schematic description, gate-level description, hardware languages like Verilog, System Verilog, or Very High Speed Integrated Circuit Hardware Description Language (VHDL), or any combination of thereof.

The non-volatile memory 120 can be configured to store instructions in a form of bit file 125 to be executed by the FPGA 115. The FPGA 115 can be configured by the instructions to perform one or more floating point operations including multiplication and addition to calculate a sum of products that can be used in neural network computations.

The volatile memory 110 can be configured to store weights W[i] for neurons of one or more ANNs, input values V[i] to be processed for the ANNs, and results of ANNs computation including any intermediate results of computations of layers of the ANNs.

Figure 2:
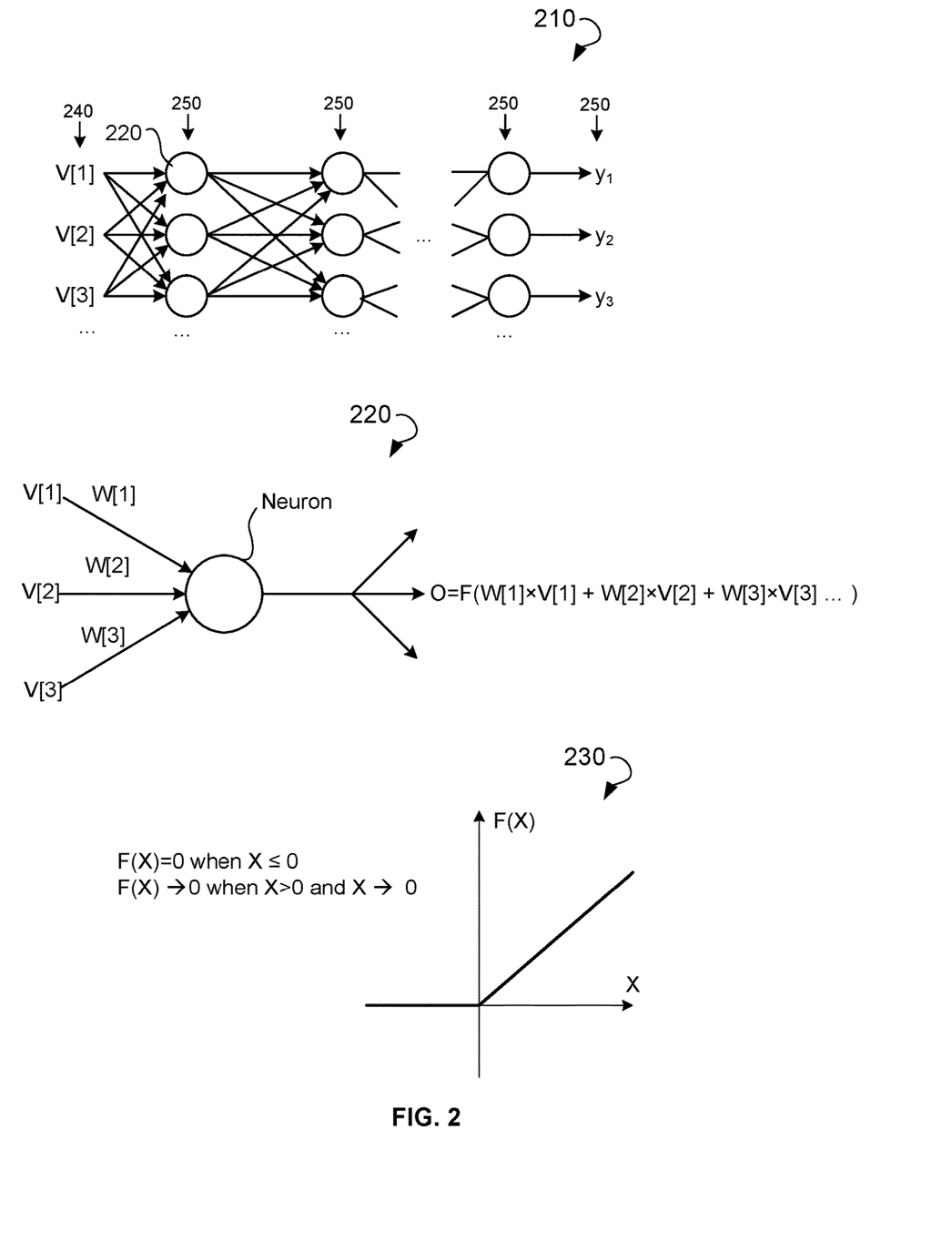
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may be represented by a calculation of the following mathematical function:

$$O = F\left(\sum_{i=1}^{n} V[i] \times W[i]\right) \quad (1)$$

wherein V[i] are neuron input values, W[i] are weights assigned to input values at the neuron, and F(X) is a transfer function. Typically, the transfer function 230 F(X) is selected to be zero for X<0 and have a limit of zero as X approaches zero. For example, the transfer function F(X) can be in the form of a sigmoid. The result of the calculation of a neuron propagates as an input value of further neurons in the ANN. The further neurons can belong to either the next layer, previous layer, or the same layer.

It should be noted that while the ANN 210 illustrated in FIG. 2 can be referred to as a feedforward neural network, embodiments of the present disclosure can be also used in computations of convolutional neural networks, recurrent neural networks, long short-term memory networks, and other types of ANNs.

Figure 3:
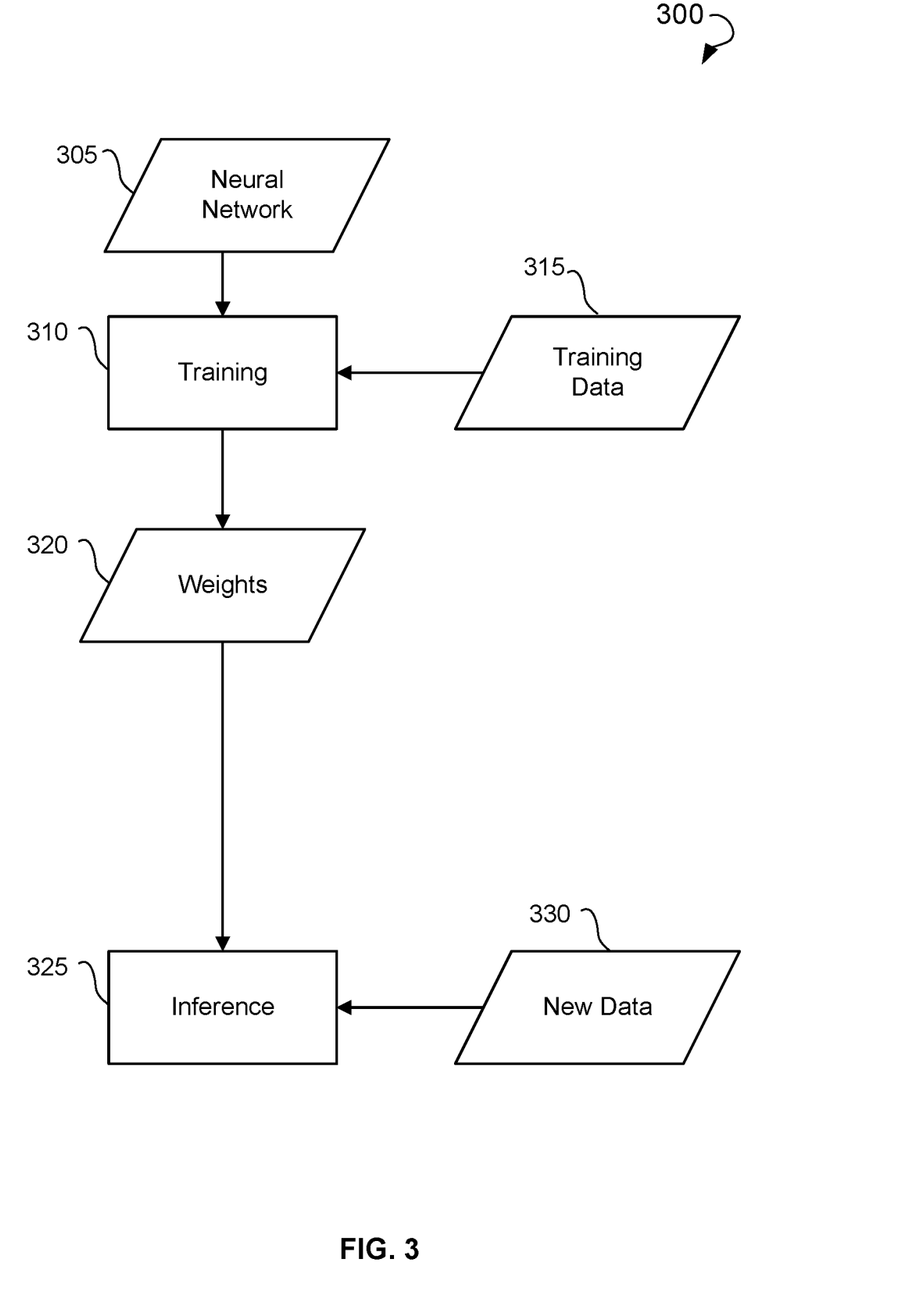
FIG. 3 is a flow chart showing training and inference of an ANN, according to some example embodiments.

FIG. 3 is a flow chart showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each sample may be represented as a pair of input values and expected output. The training data 315 may include hundreds to millions of samples. While training 310 is needed to be performed only once, it may require a significant number of computations and take considerable time.

The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 can use the trained ANN weights 320 and new data 330 including new sets of input values. For each new set of input values, the computation of the ANN provides a new output which answer the problem that the ANN is supposed to solve. For example, an ANN can be trained to recognize various animals in images. Correspondingly, the ANN can be trained using millions of images of animals. Submitting a new image to the ANN would provide the information for animals in the new image (this process is known as image tagging). While the inference for each image takes fewer computations than training, number of inferences can be large because new images can be received from billions of sources.

The inference 325 includes multiple computations of the sum of the following products:

$$\sum_{i=1}^{n} V[i] \times W[i] \qquad (2)$$

wherein the V[i] are new input values and W[i] are weights associated with neurons of the ANN.

A computational engine (residing, for example, in a computing cloud) configured to perform ANN computations can be configured to process a batch of input datasets, for example, a sequence of images, a sequence of voice recordings, a sequence of videos, a sequence of handwritten messages, and so forth. A batch size of ANN is the number of input datasets that are passed to the ANN at once. The time of processing of the batch of input datasets can be affected by the latency of ANN. The latency can be defined as the time the ANN processes one input dataset from the batch. According to embodiments of the present disclosure, an optimal batch size can be determined for each layer of the ANN to reduce latency of the ANN and determine an optimal batch size for the ANN.

Figure 4:
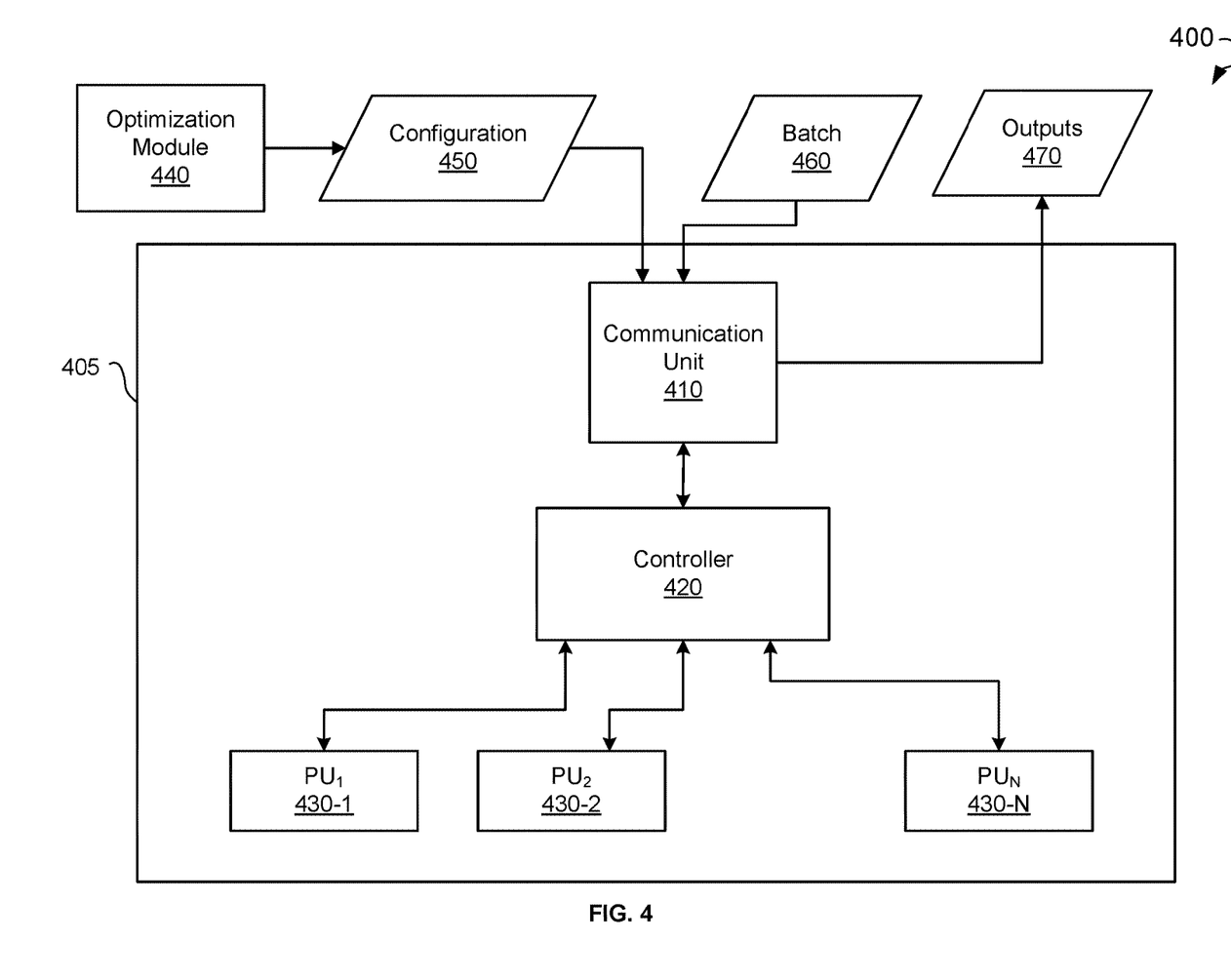
FIG. 4 is a block diagram showing a system for optimizing ANN computations based on automatic determination of a batch size, according to an example embodiment.

FIG. 4 is a block diagram showing a system 400 for optimizing ANN computations based on automatic determination of a batch size, according to some example embodiments. The system 400 may include a computational engine 405 configured to perform ANN computations. The computational engine 405 may include a communication unit 410, a controller 420, and one or more processing units 430-$i$ ($i=1, \ldots, N$). The computational engine 405 may further include a memory controller and a plurality of memories to store data associated with the ANN and input dataset for ANN computations.

The system 400 may further include an optimization module 440 configured to generate a configuration 450 for the computational engine 405. The controller 420 of the computational engine 405 may assign, based on the configuration 450, batch sizes to layers of ANN. The controller 420 may also configure the processing units 430-$i$ ($i=1, \ldots, N$) to perform computations of the layers of ANN.

After assigning the batch sizes to layers of the ANN and configuring the processing units 430-$i$ ($i=1, \ldots, N$) to perform computations of the layers of the ANN, the controller 420 may receive, via the communication unit 410, a batch 460 of input datasets for the ANN. The controller 420 may further perform computations of layers of the ANN by using the processing units 430-$i$ ($i=1, \ldots, N$) to obtain outputs 470 for input datasets in the batch 460.

Figure 5:
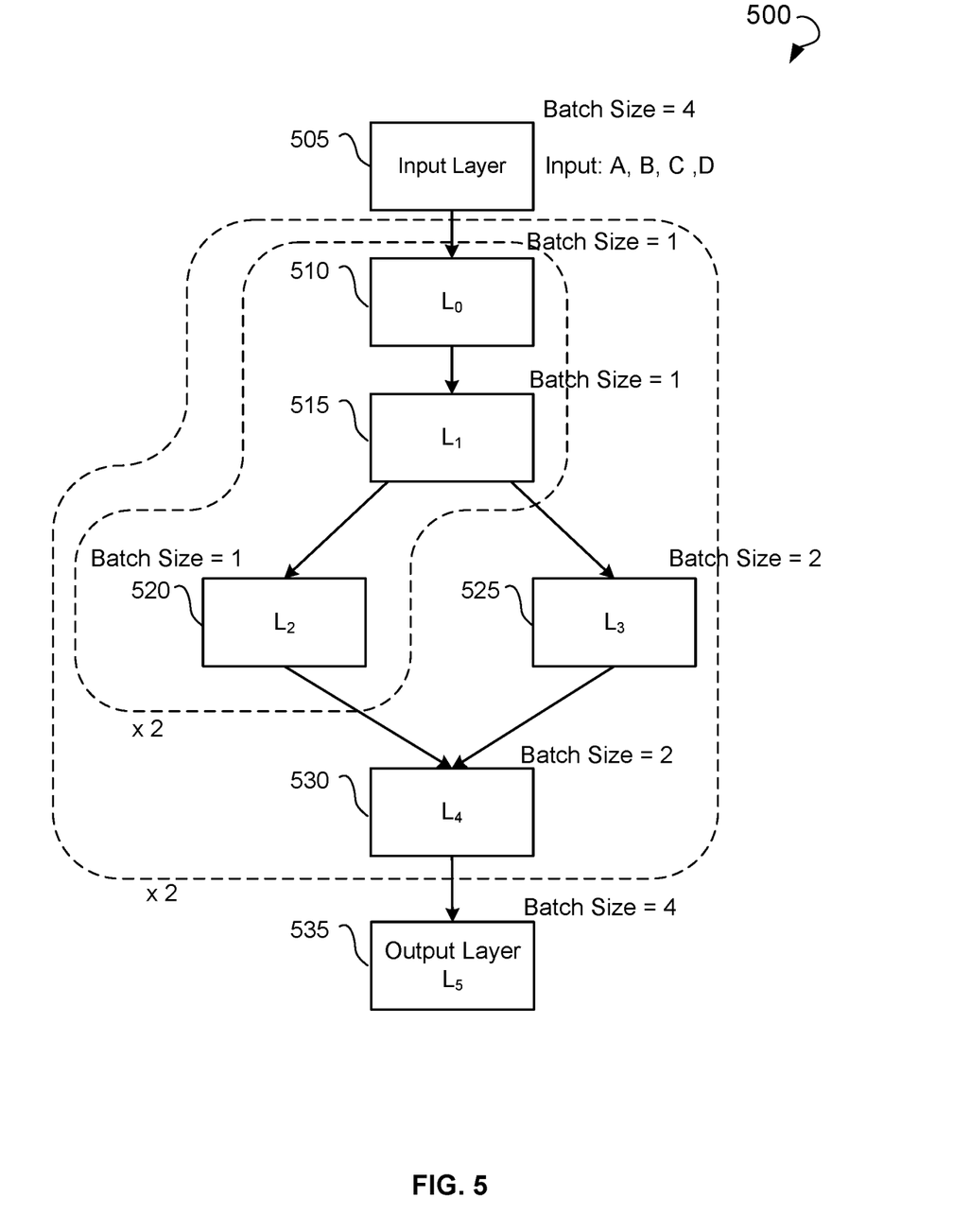
FIG. 5 is a block diagram showing an ANN, according to example embodiment.

FIG. 5 shows an example ANN 500. The ANN 500 may include an input layer 505, hidden layers 510, 515, 520, 525, 530, and output layer 535. In example of FIG. 5, the batch size of ANN is equal to 4. The batch of ANN can include a sequence of input datasets A, B, C, and D. The hidden layers 510, 515, and 520 can be assigned a batch size 1 and the hidden layers 525 and 530 can be assigned a batch size 2. The output layer 535 can be assigned a batch size 4.

The batch of the hidden layer 525 may include two input datasets. Inputs of the hidden layer 525 are outputs of the hidden layer 515. Because the hidden layer 515 has batch size 1, the hidden layer 515 (and previous hidden layer 510) may be required to be executed twice to obtain two inputs for the batch of the hidden layer 525.

Similarly, the batch of the hidden layer 530 includes two inputs. Each input of the hidden layer 530 includes an output from the hidden layer 520 and an output of the hidden layer 525. Because the hidden layer 520 has batch size 1, the hidden layer 520 (and previous hidden layers 510 and 515) is required to be executed twice to obtain two inputs for the batch of the hidden layer 530. Because the hidden layer 525 has batch size 2, the same as the batch size of the hidden layer 530, the hidden layer 525 is required to be executed once to obtain two inputs for the batch of the hidden layer 530.

The batch of the output layer 535 includes four inputs. Inputs for the output layer 535 are outputs of the hidden layer 530. Because the batch of the hidden layer 530 is two, the hidden layer 530 is required to be executed twice to fill the batch of the output layer 535.

Figure 6A:
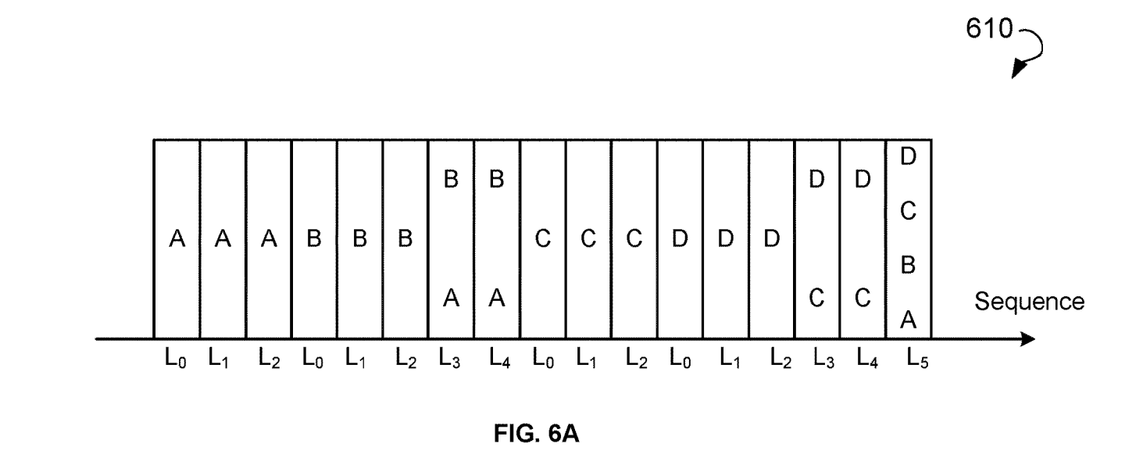
FIG. 6A is a plot showing a sequence of computations of layers in ANN computations, according to an example embodiment.

FIG. 6A shows a plot 610 of a sequence of computation of layers of the ANN 500, according to an example embodiment. In the example of FIG. 6A, the subpart of ANN 500 including the hidden layers 510 ($L_0$), 515 ($L_1$), and 520 ($L_2$) is first executed twice, once for input dataset A and once for the input dataset B. Then, the hidden layer 525 ($L_3$) can be executed once using the batch including two outputs of the hidden layer 515 ($L_1$), where the two outputs are generated based on input dataset A and B. After computation of the hidden layer 525 ($L_3$) are finished, the hidden layer 530 ($L_4$) can be executed once using batch of two inputs, where a first input is based on of the outputs of layers 520 ($L_2$) and 525 ($L_3$) generated based on input dataset A and a second input is based on the outputs of layers 520 ($L_2$) and 525 ($L_3$) generated based on input dataset B. The whole sequence of computations of layers $L_0$, $L_1$, $L_2$, $L_3$, and $L_4$ is further repeated one more time for the input datasets C and D. As a result, the layer $L_4$ generates four outputs which are based on the input datasets A, B, C, and D. The four outputs of the layer L4 may form a batch for computation of the output layer 535 ($L_5$).

Figure 6B:
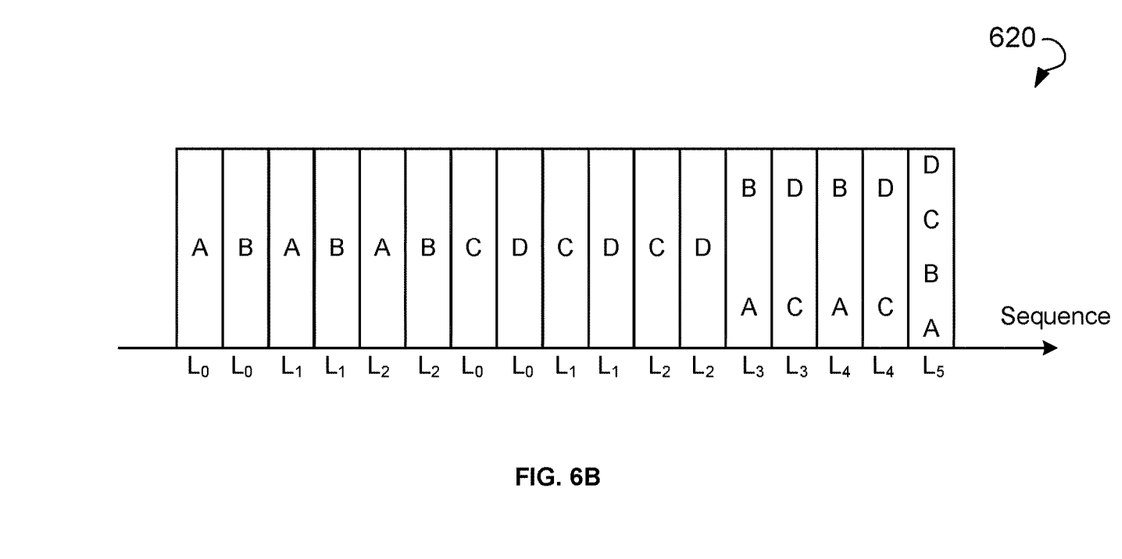
FIG. 6B is a plot showing a sequence of computations of layers in ANN computations, according to another example embodiment.

FIG. 6B shows a plot 620 of a sequence of computation of layers of the ANN 500, according to another example embodiment. In the example of FIG. 6A, the layers $L_0$, $L_1$, $L_2$ are executed first to obtain outputs based on the input datasets A, B, C, and D in the batch of ANN 500. The layer $L_3$ is then executed twice for two batches, wherein the first batch includes two outputs of layer $L_2$ generated based on input datasets A and B, and the second batch includes two outputs of layer $L_2$ generated based on input datasets C and D. The layer $L_4$ is then executed twice for two batches, wherein the first batch incudes outputs of previous layers $L_2$ and $L_3$ generated based on input datasets A and B and the second batch includes outputs of previous layers $L_2$ and $L_3$ generated based on input datasets C and D. Being executed twice, the layer $L_4$ generates four outputs which are based on the input datasets A, B, C, and D. The four outputs of the layer $L_4$ may form a batch for computation of the output layer 535 ($L_5$).

The sequence of computations of layers in the ANN can be based on the batch sizes of the layers, job allocation of computation of layers in the processing units 430-$i$ (i=1, . . . , N), and memory allocation of weights of neurons of layers, inputs of layers, outputs of layers in memories of computational engine 405. The sequence of the computation of layers can depend on latencies and throughputs of memories storing input data of layers and other information related to the layers. Due to the latencies and throughputs, the sequence shown in FIG. 6B can be a better choice than the sequence described in FIG. 6A, even though results of the execution of the sequences can be the same.

Referring back now to FIG. 4, the computational engine 405 can be configured to receive a request for ANN computations. The request can be received from a user. Alternatively, the request can be received from an application running on a computer system in communication with the computational engine 405. The request can include a desired batch size, desired latency for ANN, and desired throughput of the ANN.

Prior to performing the ANN computations, the computational engine 405 can be configured by performing the following steps:

1) Job allocation. The job allocation may include distribution of the ANN computations between processing units 430-$i$ (i=1, . . . , N) to optimize utilization of each of the processing units.
2) Batch allocation. The batch allocation may include selection of batch sizes for layers in the ANN.
3) Memory allocation. The memory allocation may include generating a memory configuration for the data associated with the ANN. The memory configuration may indicate which memories in computational engine 405 should be used for storing data and parameters associated with layers and input datasets of the ANN.

Figure 7:
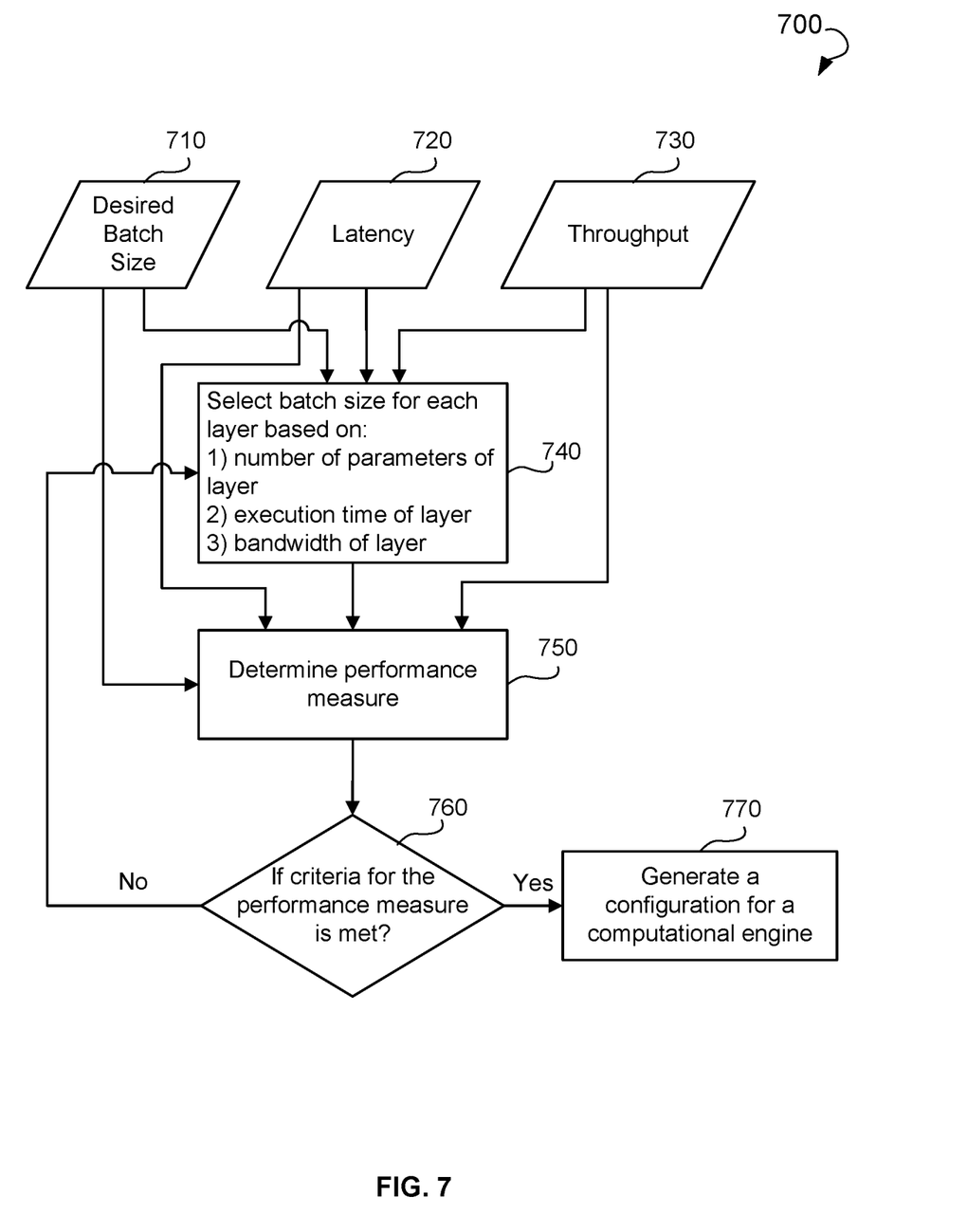
FIG. 7 is a flow chart showing steps of a method for determining a configuration of batch sizes of layers in ANN computations, according to some example embodiments.

FIG. 7 is a flow chart showing a method 700 for determining a configuration of batch sizes of layers in ANN, according to some example embodiments. The method 700 may be performed by optimization module 440.

The method 700 may commence in block 740 with selecting a batch size for each of the layers in the ANN. The selection of a batch size for a layer can be based on the number of parameters of the layer, time of execution of the layer, and bandwidth required to fetch and store the layer-related data and parameters. In some embodiments, the selection of batch sizes of the layers of ANN can be based on a heuristic algorithm.

In block 750, the method 700 may determine a performance measure. The performance measure can be a function an ANN batch size, latency of ANN, and throughput of the ANN. The ANN batch size, latency of the ANN, and throughput of the ANN can be estimated based on the batch sizes of layers determined in block 740.

In decision block 760, the method 700 may determine whether the performance measure satisfies criteria. For example, the criteria may be based on comparison of the performance measure and the desired performance measure. The desired performance measure can be a function of one or more of the desired batch size 710 for ANN, the desired latency 720 of ANN, and the desired throughput 730 of ANN. The criteria can be also based on a comparison of a number of iterations of selection of the batch sizes for the layers in the ANN to a maximum number of iterations.

The blocks 740, 750, and 760 can be iterated to find a configuration of batch sizes of layers of the ANN corresponding to an optimal performance measure. The performance measure can be tuned by a user. The user may indicate whether the performance measure is to correspond to a minimum latency of the ANN or a maximum throughput of the ANN. The batch size for the ANN can be then selected as a maximum of batch sizes of the layers of the ANN.

If the criteria are not met, the method 700 can proceed with repeating blocks 740 and 750. If the criteria are met, the method 700 may proceed to block 770. In the block 770, the method 700 may generate a configuration for the computation engine 405. The configuration may include information regarding batch sizes for the layers in the ANN, batch size for the ANN, instructions indicating an order in which the layers of the ANN should be executed.

Figure 8:
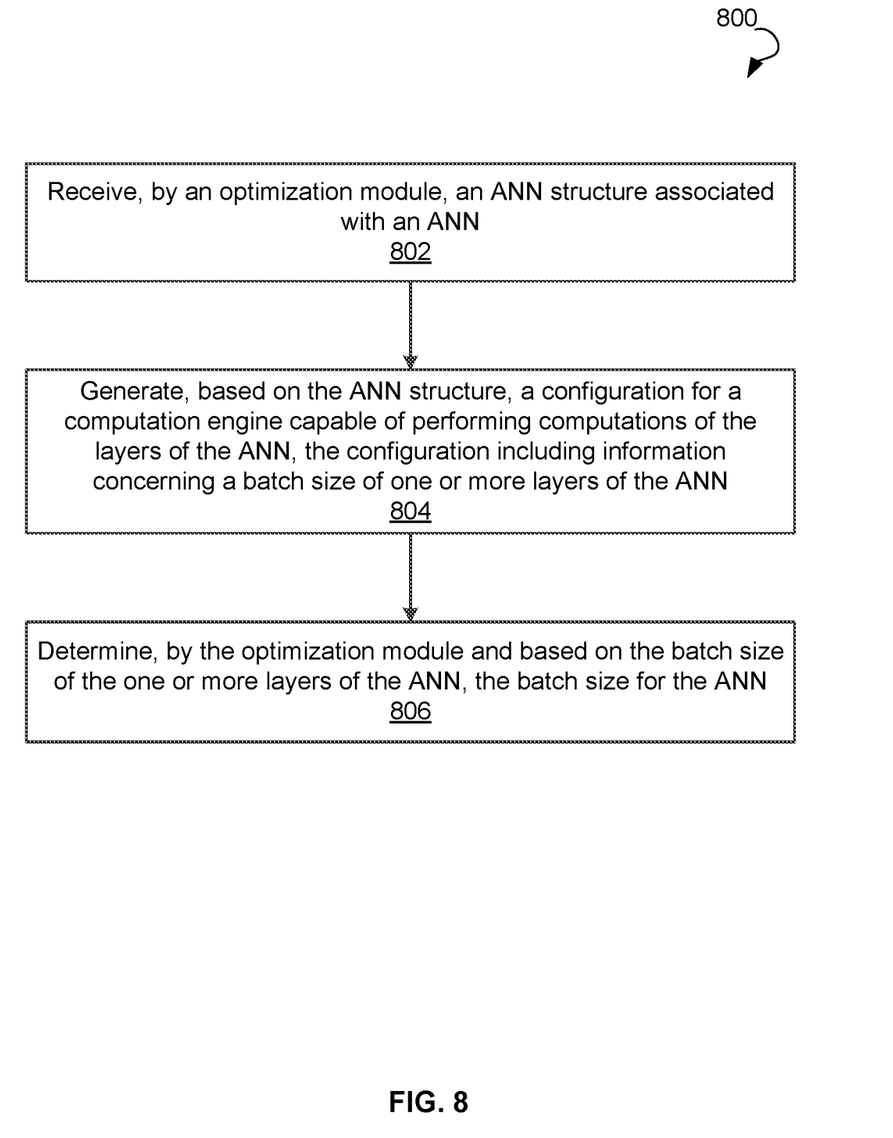
FIG. 8 is a flow chart showing steps of a method for optimizing ANN computations based on automatic determination of a batch size, according to some example embodiments.

FIG. 8 is a flow chart illustrating a method 800 for optimizing ANN computations based on automatic determination of a batch size, in accordance with some example embodiments. In some embodiments, the operations may be combined, performed in parallel, or performed in a different order. The method 800 may include additional or fewer operations than those illustrated. The method 800 may be performed by system 400 described above with reference to in FIG. 4.

In block 802, the method 800 may commence with receiving, an optimization module and an ANN structure associated with an ANN.

In block 804, the method 800 may generate, based on the ANN structure, a configuration for a computation engine capable of performing computations of the layers of the ANN. The configuration may include information concerning a batch size of one or more layers of the ANN and a sequence of performing computations for the layers of ANN. The optimization module can include a software-based module and the computation engine may include one or more hardware-based modules implemented on FPGAs.

The batch size of a layer of the ANN can be determined based on a bandwidth required to read data related to the layer, a number of parameters associated with the layer, and a time the layer processes one input dataset from the batch. The batch size of the layer of the ANN can differ from the batch size of the ANN. The ANN may include at least a first layer and a second layer such as a batch size of the first layer differs from a batch size of the second layer.

Determining the batch sizes for layers of the ANN may include performing, by the optimization module, one or more iterations of selecting batch sizes of the layers of the ANN to optimize a performance measure. The performance measure can be a function of one or more of: a latency of the ANN, a throughput of the ANN, and a desired size of ANN. The performance measure can be set based on a user input. The iterations can be carried out until a number of the iterations exceeds a predetermined threshold or the performance measure exceeds a pre-determined threshold.

In block 806, the method 800 may determine, by the optimization module and based on the batch sizes of the layers of the ANN, the batch size for the ANN. For example, the batch size of the ANN may be based on the maximum value of the batch sizes of the layers.

Figure 9:
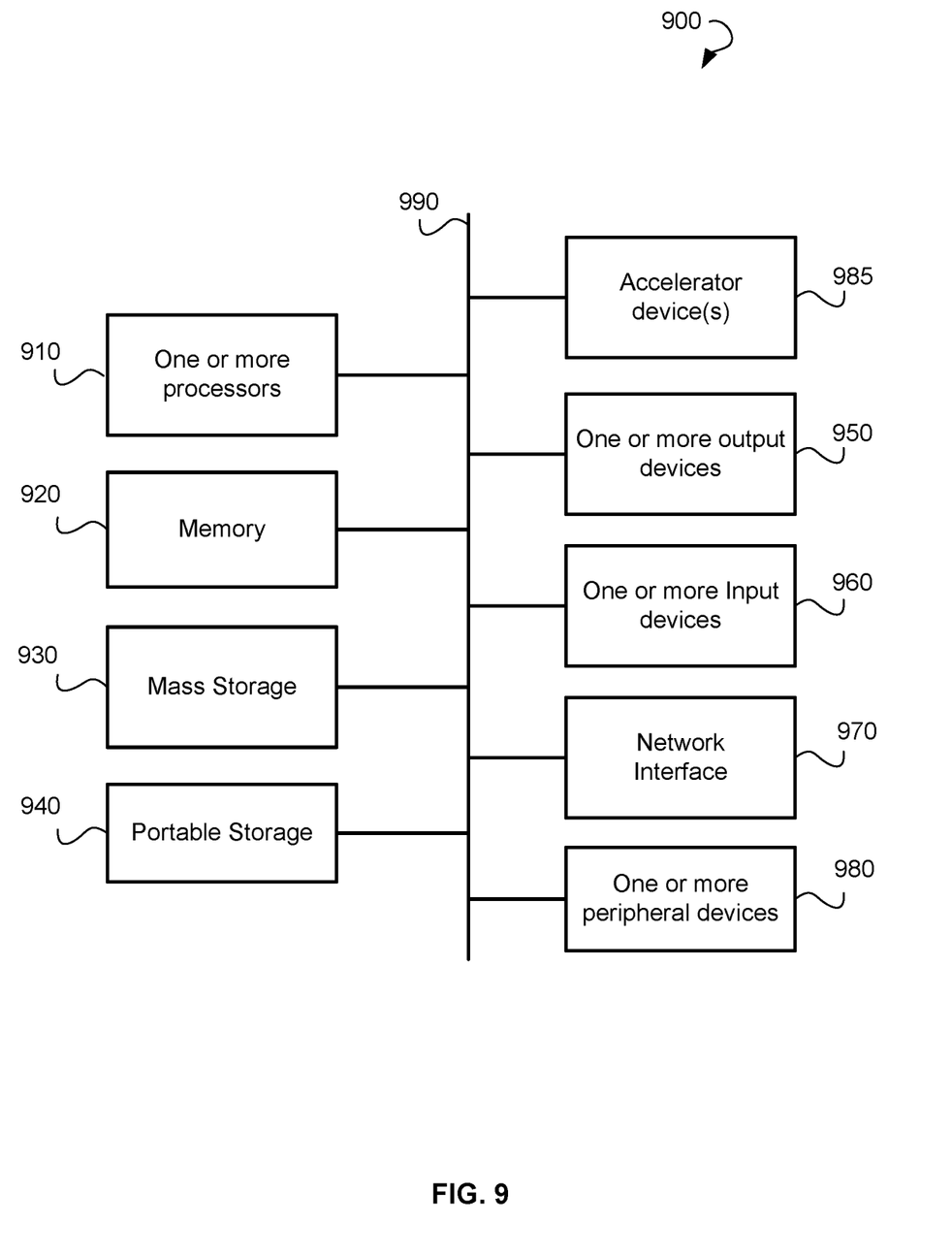
FIG. 9 shows a computing system that can be used to implement embodiments of the disclosed technology.

FIG. 9 illustrates an example computing system 900 that may be used to implement embodiments described herein. The example computing system 900 of FIG. 9 may include one or more processors 910 and memory 920. Memory 920 may store, in part, instructions and data for execution by the one or more processors 910. Memory 920 can store the executable code when the exemplary computing system 900 is in operation. The processor 910 may include internal accelerators like a graphical processing unit, a Field Programmable Gate Array, or similar accelerators that may be suitable for use with embodiments described herein. The memory 920 may include internal accelerators like a graphical processing unit, a Field Programmable Gate Array, or similar accelerators that may be suitable for use with embodiments described herein. The example computing system 900 of FIG. 9 may further include a mass storage 930, portable storage 940, one or more output devices 950, one or more input devices 960, a network interface 970, and one or more peripheral devices 980.

The components shown in FIG. 9 are depicted as being connected via a single bus 990. The components may be connected through one or more data transport means. The one or more processors 910 and memory 920 may be connected via a local microprocessor bus, and the mass storage 930, one or more peripheral devices 980, portable storage 940, and network interface 970 may be connected via one or more input/output buses.

Mass storage 930, which may be implemented with a magnetic disk drive, an optical disk drive or a solid state drive, is a non-volatile storage device for storing data and instructions for use by a magnetic disk, an optical disk drive or SSD, which in turn may be used by one or more processors 910. Mass storage 930 can store the system software for implementing embodiments described herein for purposes of loading that software into memory 920. The mass storage 930 may also include internal accelerators like a graphical processing unit, a Field Programmable Gate Array, or similar accelerators that may be suitable for use with embodiments described herein.

Portable storage 940 may operate in conjunction with a portable non-volatile storage medium, such as a compact disk (CD) or digital video disc (DVD), to input and output data and code to and from the computing system 900 of FIG. 9. The system software for implementing embodiments described herein may be stored on such a portable medium and input to the computing system 900 via the portable storage 940.

One or more input devices 960 provide a portion of a user interface. The one or more input devices 960 may include an alphanumeric keypad, such as a keyboard, for inputting alphanumeric and other information, or a pointing device, such as a mouse, a trackball, a stylus, or cursor direction keys. Additionally, the computing system 900 as shown in FIG. 9 includes one or more output devices 950. Suitable one or more output devices 950 include speakers, printers, network interfaces, and monitors.

Network interface 970 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 980 may include any type of computer support device to add additional functionality to the computing system. The one or more peripheral devices 980 may include a modem or a router.

The example computing system 900 of FIG. 9 may also include one or more accelerator devices 985. The accelerator devices 985 may include PCIe-form-factor boards or storage-form-factor boards, or any electronic board equipped with a specific electronic component like a Graphical Processing Unit, a Neural Processing Unit, a Multi-CPU component, a Field Programmable Gate Array component, or similar accelerators electronic or photonic components, that may be suitable for use with embodiments described herein.

The components contained in the exemplary computing system 900 of FIG. 9 are those typically found in computing systems that may be suitable for use with embodiments described herein and are intended to represent a broad category of such computer components that are well known in the art. Thus, the exemplary computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for optimizing ANN computations based on automatic determination of a batch size have been described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system comprising:
a computation circuit configured to perform computations of one or more layers of an artificial neural network (ANN) for a series of input datasets; and
one or more processors in communication with the computation circuit, wherein the one or more processors are configured to initiate operations including:
receiving an ANN structure and a user input, the ANN structure being associated with the ANN and the user input including a specified performance measure for the ANN; and
generating, based on the ANN structure and the user input, a configuration for the computation circuit and a memory configuration associated with the ANN, the memory configuration including a plurality of memories allocated to storing data associated with the one or more layers of the ANN, wherein the configuration corresponds to the specified performance measure and includes information concerning batch sizes of the one or more layers of the ANN, and wherein:
the one or more layers of the ANN are assigned the batch sizes based on the configuration;
the ANN includes a first layer, a second layer, and a third layer, wherein an output of the first layer is an input to the second layer and the third layer; and
the computation circuit is configured to:
determine a first latency of storing the data associated with the one or more layers in the plurality of memories when a computation of the first layer is executed prior to a computation of the second layer;
determine a second latency of storing the data associated with the one or more layers in the plurality of memories when the computation of the first layer is executed after the computation of the second layer;
determine that the second latency is less than the first latency; and
in response to the determination that the second latency is less than the first latency, perform at least one computation of the first layer before a computation of the second layer and at least one further computation of the first layer after the computation of the second layer and prior to a computation of the third layer.

2. The system of claim 1, wherein the one or more processors are configured to determine the batch sizes of the one or more layers based on a bandwidth required to read the data associated with the one or more layers.

3. The system of claim 1, wherein the one or more processors are configured to determine the batch sizes of the one or more layers based on a number of parameters associated with the one or more layers.

4. The system of claim 1, wherein the one or more processors are configured to determine the batch sizes of the one or more layers based on a time needed for the one or more layers to process one input dataset from a batch.

5. The system of claim 1, wherein the one or more processors are configured to determine a batch size for the ANN based on the batch sizes of the one or more layers of the ANN.

6. The system of claim 5, wherein at least one of the batch sizes of the one or more layers differs from the batch size of the ANN.

7. The system of claim 1, wherein a batch size of the first layer differs from a batch size of the second layer.

8. The system of claim 1, wherein the computation circuit is configured to repeat computations of a subpart of the ANN for different input datasets from the series of input datasets.

9. The system of claim 1, wherein the computation circuit is configured to perform, concurrently, a computation of the first layer of the ANN for a first input dataset of the series of input datasets and a computation of the first layer for a second input dataset of the series of input datasets prior to the computation of the second layer of the ANN, wherein an input dataset of the second layer includes an output dataset of the first layer.

10. The system of claim 1, wherein the computation circuit is implemented on a field-programmable gate array.

11. The system of claim 1, wherein the one or more processors are configured to perform one or more iterations of selecting the batch sizes of the one or more layers of the ANN to optimize a performance measure, the performance measure being a function of one or more of: a batch size of the ANN, a latency of the ANN, and a throughput of the ANN.

12. The system of claim 11, wherein the one or more processors are configured to perform the one or more iterations until a number of the one or more iterations exceeds a predetermined threshold or the performance measure matches the desired specified performance measure.

13. The system of claim 11, wherein a batch size of the second layer is less than a batch size of the third layer.

14. The system of claim 11, wherein the one or more processors are configured to select the batch sizes of the one or more layers of the ANN based on a heuristic algorithm.

15. A method comprising:
receiving, by one or more processors in communication with a computation circuit configured to perform computations of one or more layers of an artificial neural network (ANN) for a series of input datasets, an ANN structure and a user input, the ANN structure being associated with the ANN and the user input including a specified performance measure for the ANN;
generating, by the one or more processors and based on the ANN structure and the user input, a configuration for the computation circuit and a memory configuration associated with the ANN, the memory configuration including a plurality of memories allocated to storing data associated with the one or more layers of the ANN, wherein the configuration corresponds to the specified performance measure and includes information concerning batch sizes of the one or more layers of the ANN, and wherein:
the one or more layers of the ANN are assigned the batch sizes based on the configuration;
the ANN includes a first layer, a second layer, and a third layer, wherein an output of the first layer is an input to the second layer and the third layer; and
the computation circuit is configured to:

determine a first latency of storing the data associated with the one or more layers in the plurality of memories when a computation of the first layer is executed prior to a computation of the second layer;

determine a second latency of storing the data associated with the one or more layers in the plurality of memories when the computation of the first layer is executed after the computation of the second layer;

determine that the second latency is less than the first latency; and in response to the determination that the second latency is less than the first latency, perform at least one computation of the first layer before a computation of the second layer and at least one further computation of the first layer after the computation of the second layer and prior to a computation of the third layer; and determining, by the one or more processors and based on the batch sizes of the one or more layers of the ANN, a batch size for the ANN.

16. The method of claim 15, wherein the batch sizes of the one or more layers are determined based on one or more of:
a bandwidth required to read the data associated with the one or more layers;
a number of parameters associated with the one or more layers; and
a time needed for the one or more layers to process one input dataset from a batch.

17. The method of claim 15, wherein at least one of the batch sizes of the one or more layers differs from the batch size of the ANN.

18. The method of claim 15, wherein a batch size of the first layer is different from a batch size of the second layer.

19. The method of claim 15, further comprising performing, by the one or more processors, one or more iterations of selecting the batch sizes of the one or more layers of the ANN to optimize a performance measure for the ANN, the performance measure being a function of one or more of: a latency of the ANN, a throughput of the ANN, and a user-specified batch size of the ANN.

20. A system comprising:
a computation circuit configured to perform computations of one or more layers of an artificial neural network (ANN) for a series of input datasets; and
one or more processors in communication with the computation circuit, wherein the one or more processors are configured to initiate operations including:
receiving an ANN structure and a user input, the ANN structure being associated with the ANN and the user input including a specified performance measure for the ANN;
generating, based on the ANN structure and the user input, a configuration for the computation circuit and a memory configuration associated with the ANN, the memory configuration including a plurality of memories allocated to storing data associated with the one or more layers of the ANN, wherein the configuration corresponds to the specified performance measure and includes information concerning batch sizes of the one or more layers of the ANN, and wherein:
the one or more layers of the ANN are assigned the batch sizes based on the configuration;
the ANN includes a first layer, a second layer, and a third layer, wherein an output of the first layer is an input to the second layer and the third layer; and
the computation circuit is configured to:
determine a first latency of storing the data associated with the one or more layers in the plurality of memories when a computation of the first layer is executed prior to a computation of the second layer;
determine a second latency of storing the data associated with the one or more layers in the plurality of memories when the computation of the first layer is executed after the computation of the second layer;
determine that the second latency is less than the first latency; and
in response to the determination that the second latency is less than the first latency, perform at least one computation of the first layer before a computation of the second layer and at least one further computation of the first layer after the computation of the second layer and prior to a computation of the third layer; and
determining a batch size for the ANN based on the batch sizes of the one or more layers of the ANN.

* * * * *